United States Patent
Sim et al.

(10) Patent No.: US 8,666,454 B2
(45) Date of Patent: Mar. 4, 2014

(54) MOBILE TERMINAL AND METHOD OF CONTROLLING THE SAME

(75) Inventors: Sungsoo Sim, Seoul (KR); Hwangoo Park, Seoul (KR); Beomseok Cho, Seoul (KR)

(73) Assignee: LG Electronics Inc., Seoul (KR)

(*) Notice: Subject to any disclaimer, the term of this patent is extended or adjusted under 35 U.S.C. 154(b) by 454 days.

(21) Appl. No.: 13/029,019

(22) Filed: Feb. 16, 2011

(65) Prior Publication Data

US 2012/0044163 A1   Feb. 23, 2012

(30) Foreign Application Priority Data

Aug. 23, 2010 (KR) .................. 10-2010-0081593

(51) Int. Cl.
*H04M 1/00* (2006.01)
*G06F 3/041* (2006.01)
*G09G 5/00* (2006.01)

(52) U.S. Cl.
USPC .................. 455/566; 345/173; 345/156

(58) Field of Classification Search
USPC ........... 455/566, 414.1, 418, 419, 420, 422.1, 455/437; 345/173, 156; 707/104.1, 707/E17.009; 705/14, 14.26, 14.39; 709/217
See application file for complete search history.

(56) References Cited

U.S. PATENT DOCUMENTS

| | | | | |
|---|---|---|---|---|
| 8,180,396 B2* | 5/2012 | Athsani et al. | ................ | 455/557 |
| 2005/0046706 A1* | 3/2005 | Sesek et al. | ................ | 348/231.3 |
| 2006/0104483 A1* | 5/2006 | Harel et al. | ................ | 382/115 |
| 2007/0106721 A1* | 5/2007 | Schloter | ................ | 709/200 |
| 2007/0162942 A1* | 7/2007 | Hamynen et al. | ................ | 725/105 |
| 2007/0164988 A1* | 7/2007 | Ryu et al. | ................ | 345/156 |
| 2008/0071559 A1* | 3/2008 | Arrasvuori | ................ | 705/1 |
| 2008/0147730 A1* | 6/2008 | Lee et al. | ................ | 707/104.1 |
| 2009/0015653 A1* | 1/2009 | Baek | ................ | 348/14.02 |
| 2009/0081959 A1* | 3/2009 | Gyorfi et al. | ................ | 455/70 |
| 2009/0216446 A1* | 8/2009 | Ma et al. | ................ | 701/213 |
| 2009/0278948 A1 | 11/2009 | Hayashi | | |
| 2011/0081952 A1* | 4/2011 | Song et al. | ................ | 455/566 |
| 2011/0275415 A1* | 11/2011 | Lee et al. | ................ | 455/566 |

OTHER PUBLICATIONS

UMTS Forum Report, "Support of Third Generation Services using UMTS in a Converging Network Environment—Report 14", Jan. 2002.

* cited by examiner

*Primary Examiner* — Melody Mehrpour
(74) *Attorney, Agent, or Firm* — Lee, Hong, Degerman, Kang & Waimey

(57) ABSTRACT

A mobile terminal and a method of controlling the same are provided. The mobile terminal comprises a camera; a display displaying an image obtained by the camera; and a controller superposing one or more information items corresponding to one or more specific locations included in the obtained image on the one or more specific locations and displaying the obtained image with the one or more information items. The one or more information items and position information tagged on the one or more specific locations are acquired from a social network service (SNS) server. The present invention acquires information on which position information is tagged from the SNS server, superposes the information on a obtained image and displays the obtained image with the information superposed thereon to thereby effectively transmit information to a user of the mobile terminal.

19 Claims, 28 Drawing Sheets

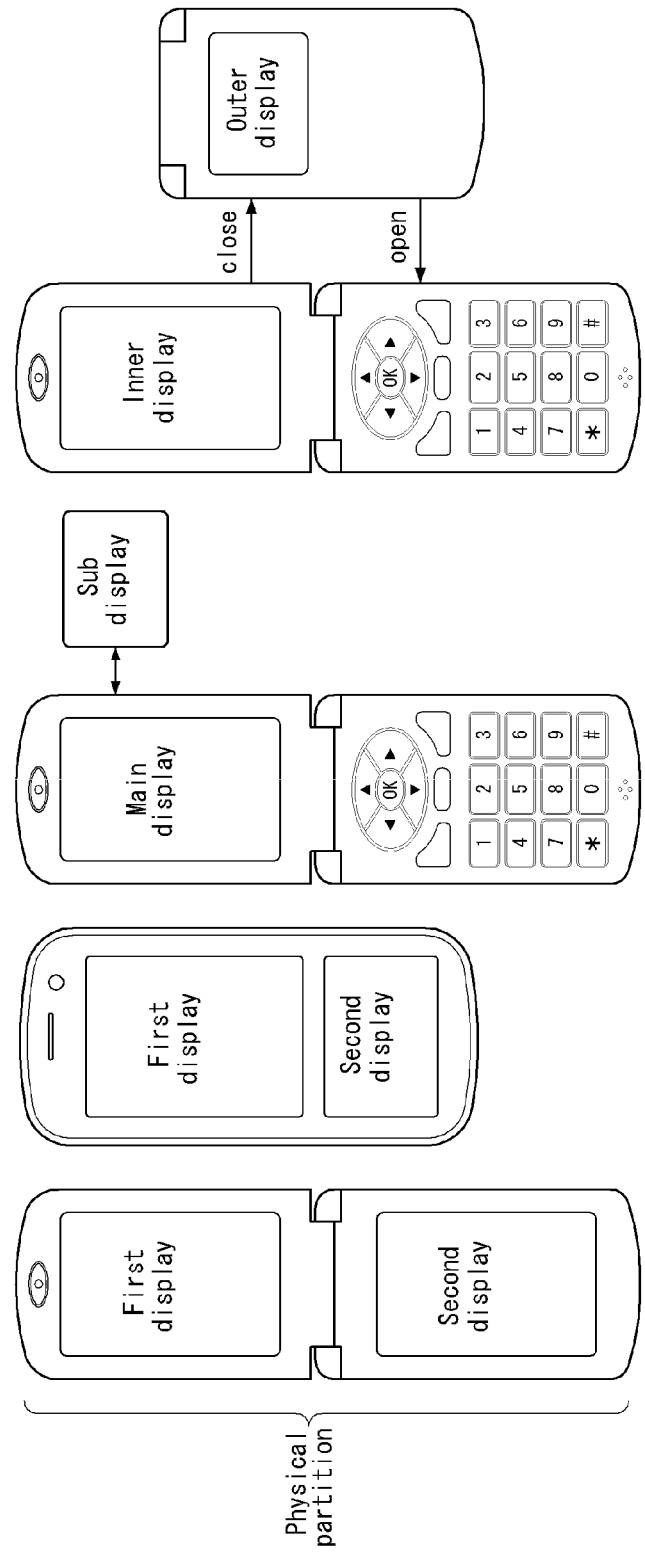

MOBILE TERMINAL AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2010-0081593, filed on Aug. 23, 2010, the contents of which is hereby incorporated by reference herein in its entirety.

BACKGROUND

1. Field

This document relates to a mobile terminal and a control method thereof and, more particularly, to a mobile terminal and a control method thereof to acquire information on which position information is tagged from a social network service server, superpose the acquire information on a captured image and display the captured image with the information superposed thereon to thereby effectively transmit information to a user of the mobile terminal.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals provide more complex and various functions.

SUMMARY

An aspect of this document is to provide a mobile terminal and a control method thereof to acquire information on which position information is tagged from a social network service server, superpose the acquire information on a captured image and display the captured image with the information superposed thereon to thereby effectively transmit information to a user of the mobile terminal.

BRIEF DESCRIPTION OF THE DRAWINGS

The implementation of this document will be described in detail with reference to the following drawings in which like numerals refer to like elements.

FIGS. 2C and 2D illustrate forms of the mobile terminal and display screens according to various embodiments of this document;

DETAILED DESCRIPTION

This document will now be described more fully with reference to the accompanying drawings, in which exemplary embodiments of this document are shown. This document may, however, be embodied in many different forms and should not be construed as being limited to the embodiments set forth herein; rather, there embodiments are provided so that this disclosure will be thorough and complete, and will fully convey the concept of this document to those skilled in the art.

Hereinafter, a mobile terminal relating to this document will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
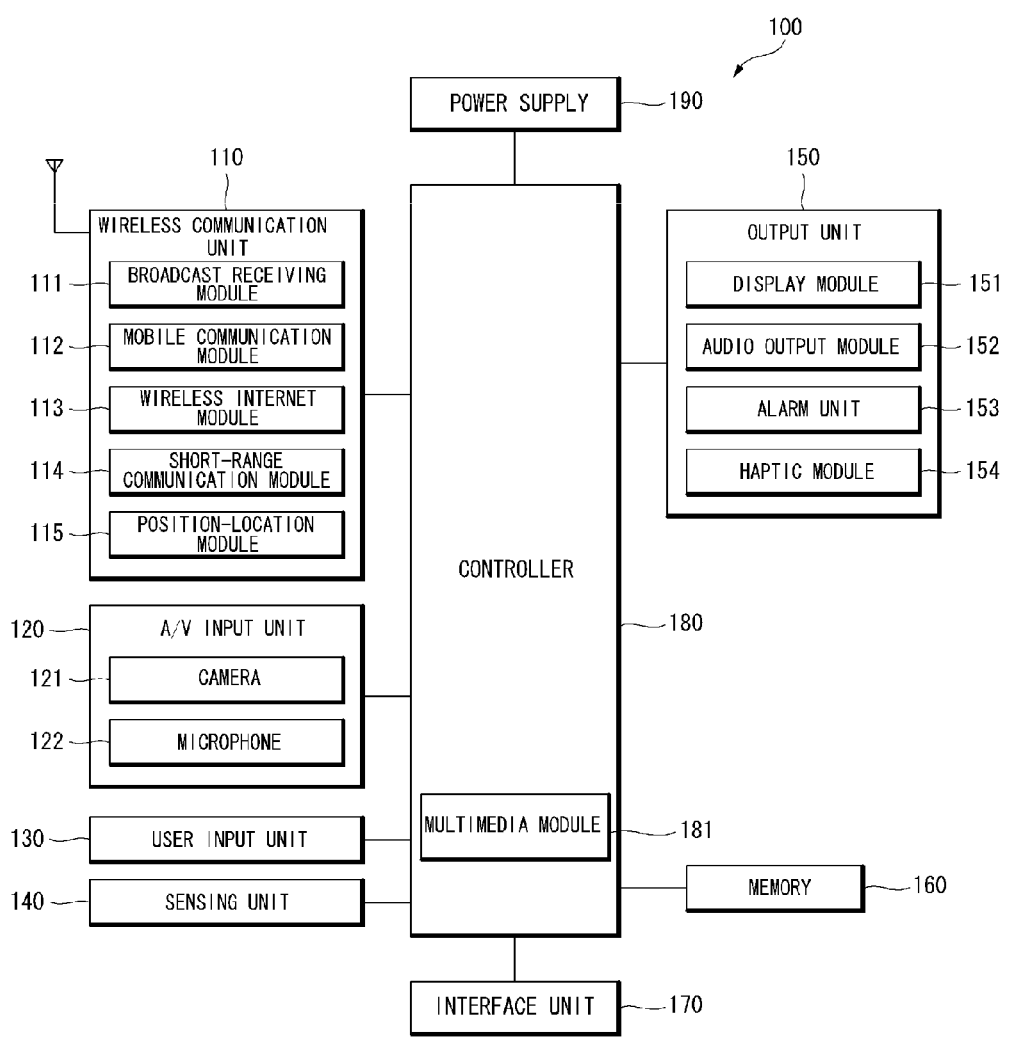
FIG. 1 is a block diagram of a mobile terminal according to an embodiment of this document.

FIG. 1 is a block diagram of a mobile terminal 100 according to an embodiment of this document. Other embodiments, configurations and arrangements may also be provided. As shown, the mobile terminal 100 may include a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 may be essential parts and the number of components included in the mobile terminal 100 may be varied. The components of the mobile terminal 100 will now be described.

The radio communication unit 110 may include at least one module that enables radio communication between the mobile terminal 100 and a radio communication system or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for local area communication. Further, Bluetooth®, radio frequency identification (RFID), infrared data association (IrDA), ultra wideband (UWB) and/or Zig-Bee® may be used as a local area communication technique.

The location information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the location information module 115. The GPS module 115 may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module 115 may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display 151 which may be a touch screen.

The image frames processed by the camera 121 may be stored in the memory 160 or may be transmitted to an external device through the radio communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141.

The output unit 150 may generate visual, auditory and/or tactile output and may include the display 151, an audio output module 152, an alarm 153 and a haptic module 154. The display 151 may display information processed by the mobile terminal 100. The display 151 may display a user interface (UI) or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

In addition, the display 151 may include at least one of a liquid crystal display, a thin film transistor liquid crystal display, an organic light-emitting diode display, a flexible display and a three-dimensional display. Some of these displays may be of a transparent type or a light transmissive type. That is, the display 151 may include a transparent display.

The transparent display may include a transparent liquid crystal display. The rear structure of the display 151 may also be of a light transmissive type. Accordingly, a user may see an object located behind the body of the mobile terminal 100 through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the radio communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm 153 may output a signal for indicating generation of an event of the mobile terminal 100. For example, alarms may be generated when receiving a call signal, receiving a message, inputting a key signal, or inputting touch. The alarm 153 may also output signals in forms different from video signals or audio signals, for example, a signal for indicating generation of an event through vibration. The video signals or the audio signals may also be output through the display 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
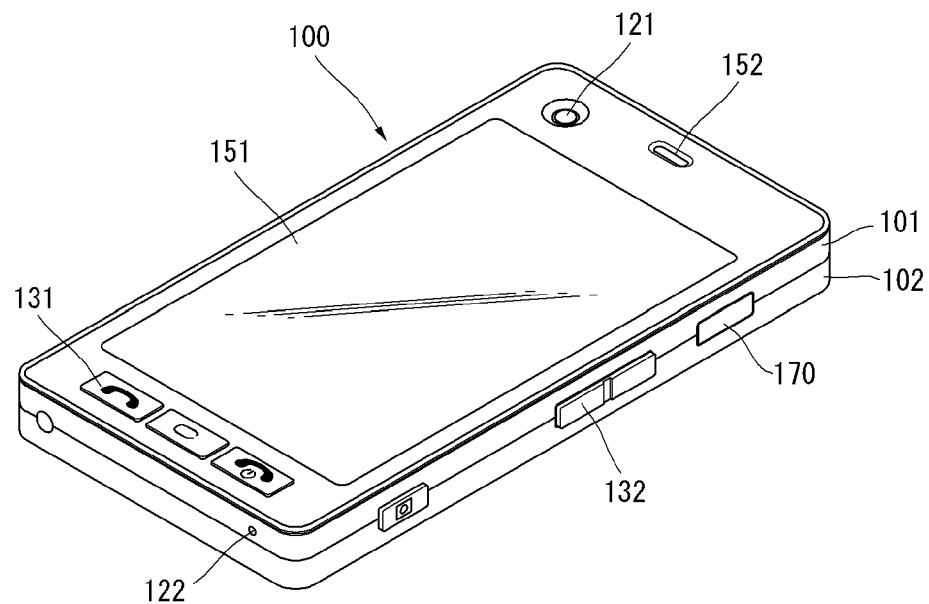
FIG. 2A is a front perspective view of the mobile terminal according to an embodiment of this document.

FIG. 2A is a front perspective view of a mobile terminal or a handheld terminal 100 according to an embodiment of this document.

The handheld terminal 100 has a bar type terminal body. However, this document is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
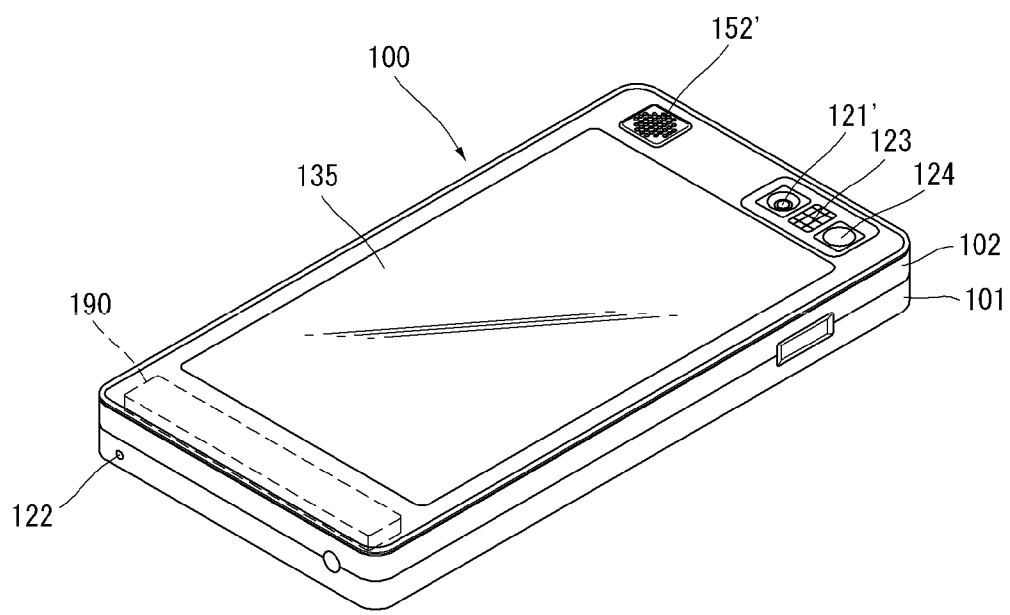
FIG. 2B is a rear perspective view of the mobile terminal according to an embodiment of this document.

FIG. 2B is a rear perspective view of the handheld terminal shown in FIG. 2A according to an embodiment of this document.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 2D:
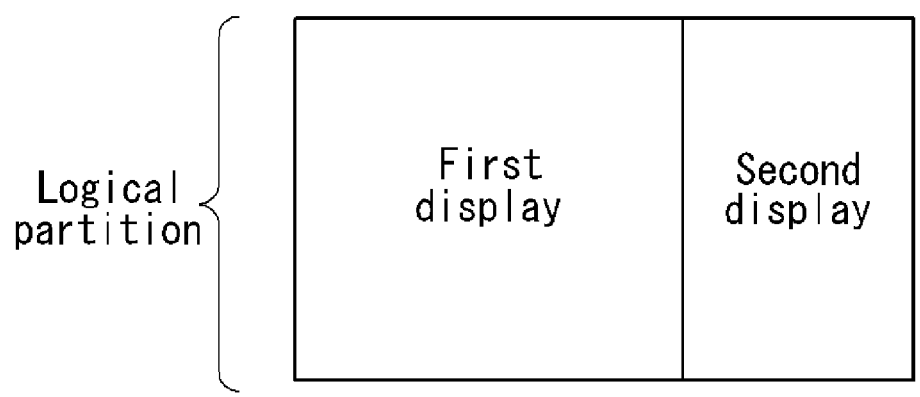

FIGS. 2C and 2D illustrate the mobile terminal 100 and the display unit 151 according to various embodiments of this document.

Referring to FIG. 2C, the display unit 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display unit 151 can include first and second displays which are logically separated from each other in a display panel, as illustrated in FIG. 2D.

Figure 3:
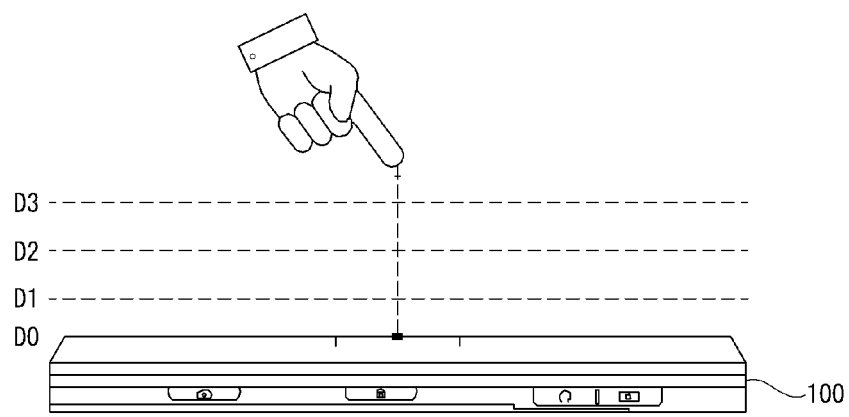
FIG. 3 is a conceptional view for explaining a proximity depth of a proximity sensor.

FIG. 3 is a conceptional view for explaining a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
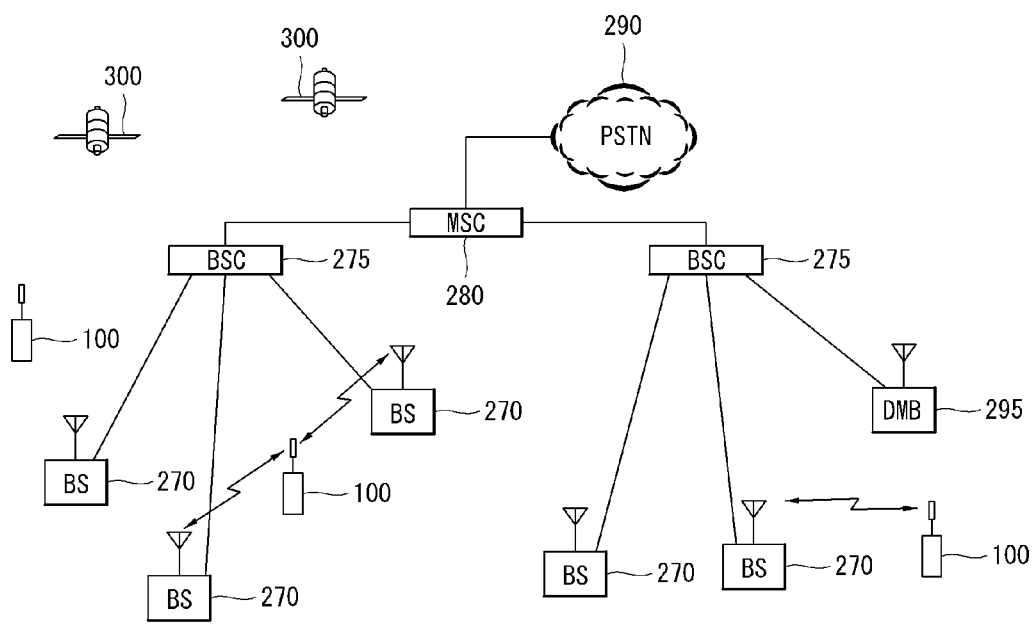
FIG. 4 illustrates a configuration of a CDMA wireless communication system communicating with the mobile terminal shown in FIG. 1.

Referring to FIG. 4, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the mobile terminals 100 operating in the CDMA wireless communication system. The broadcasting receiving module 111 of each mobile terminal 100 is constructed to receive the broadcasting signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the mobile terminals 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 5:
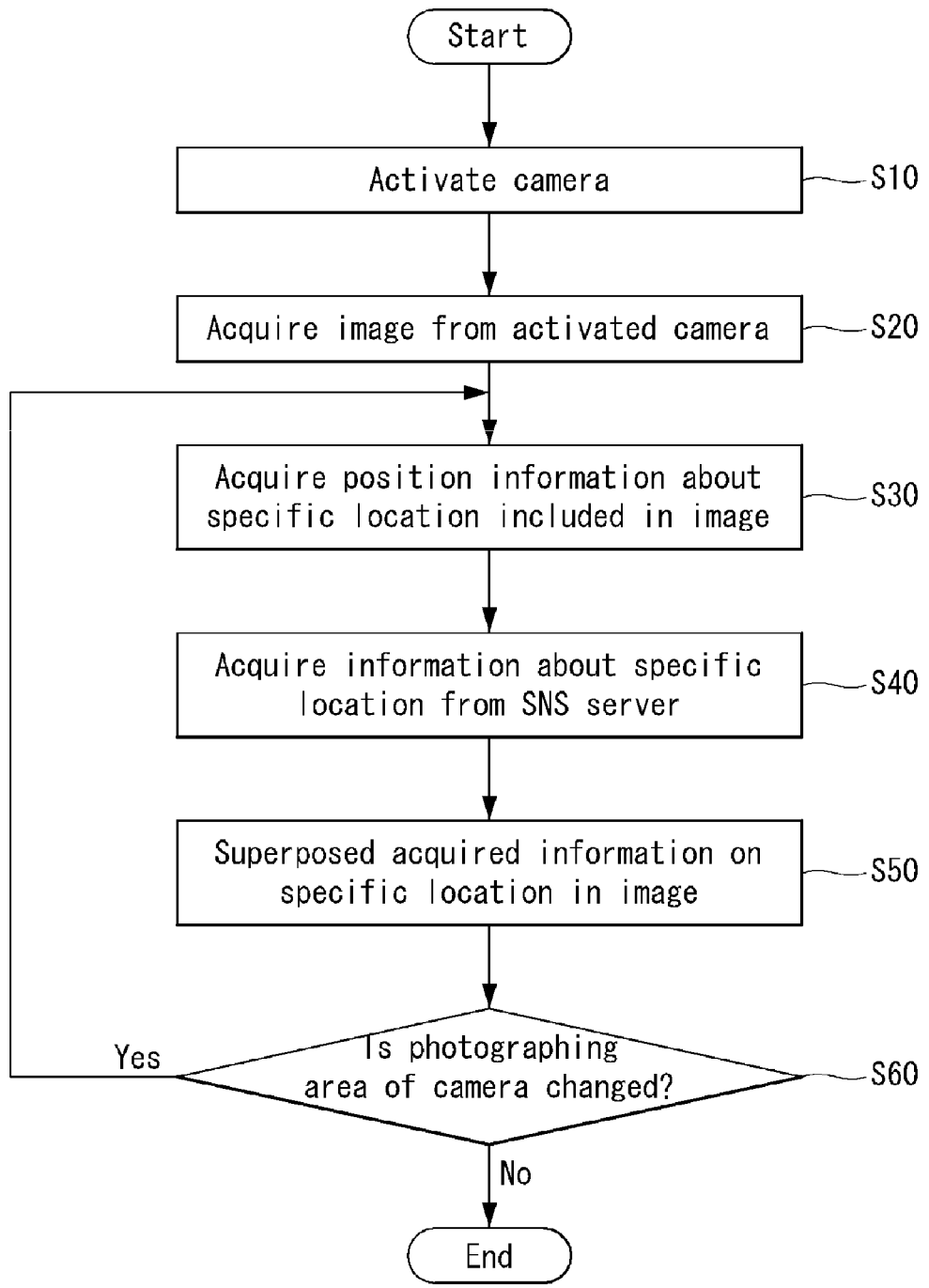
FIG. 5 is a flowchart illustrating an operation of the mobile terminal shown in FIG. 1 according to an embodiment of this document.
Figure 6:
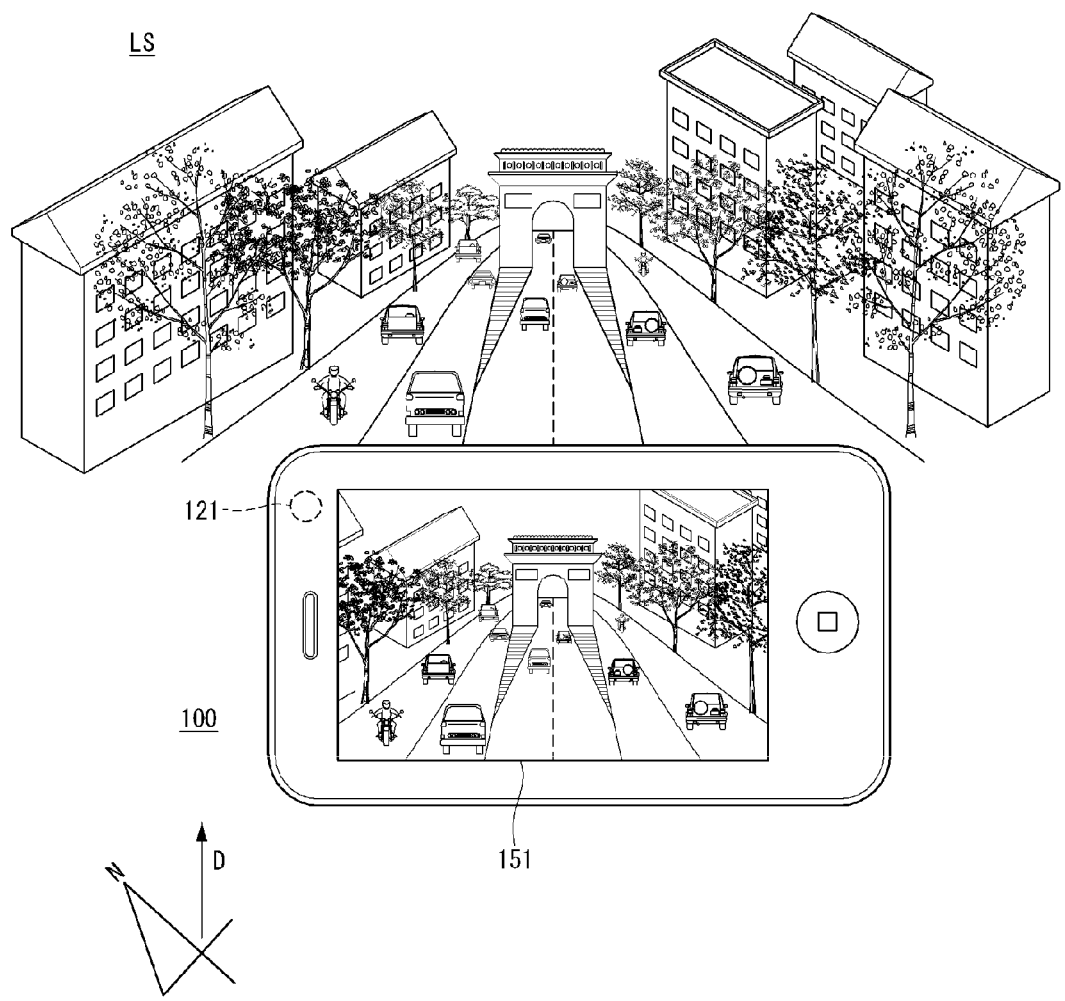
FIGS. 6, 7 and 8 illustrate an operating process of the mobile terminal according to the operation shown in FIG. 5.
Figure 7:
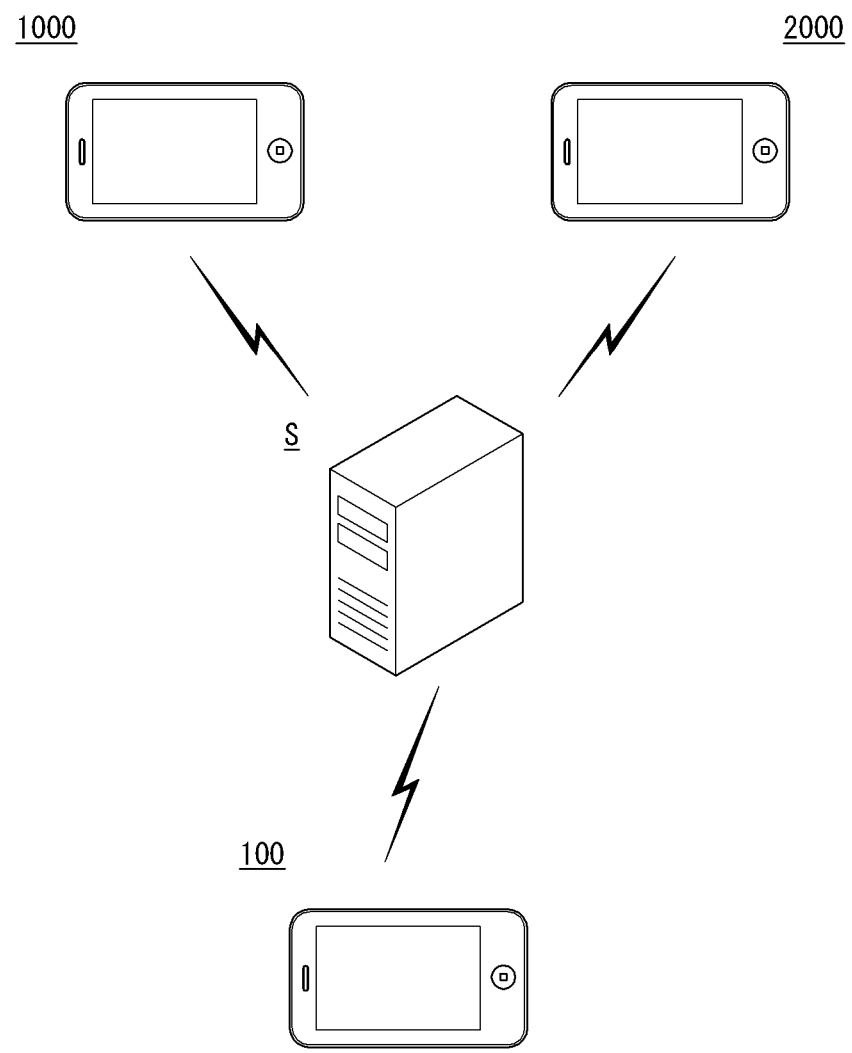
Figure 8:
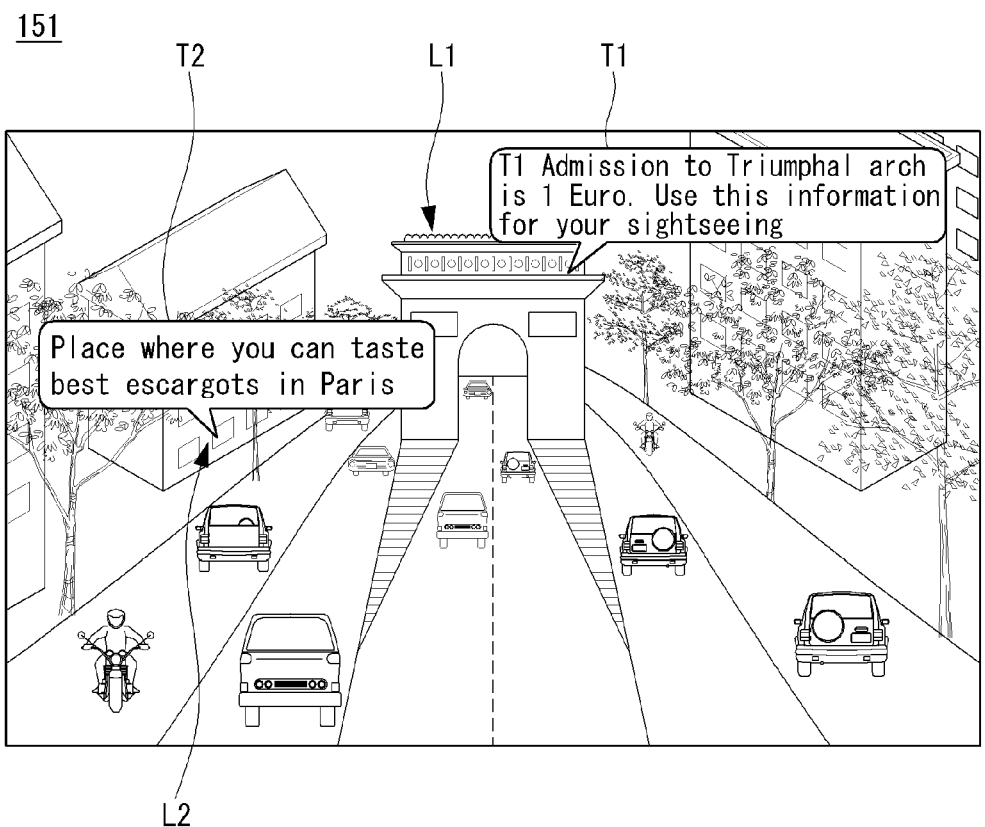

FIG. 5 is a flowchart illustrating an operation of the mobile terminal 100 shown in FIG. 1 according to an embodiment of this document and FIGS. 6, 7 and 8 illustrate an operating process of the mobile terminal according to the operation shown in FIG. 5.

Referring to FIGS. 1 and 5, the controller 180 of the mobile terminal 100 may activate the camera 121. The camera 121 may be provided to the front side of backside of the mobile terminal 100. The camera placed on the front side or backside of the mobile terminal 100 can be represented by 121 or 121', as described above. However, the camera is denoted by 121 hereinafter for convenience of understanding and the position of the camera is not limited to a specific point by the reference numeral.

The camera 121 may be activated or inactivated by a user's operation or a control operation of the controller 180. For example, the controller 180 can activate or inactivate the camera 121 based on a sensing value of a posture sensor that can sense the gesture of the mobile terminal 100. The posture sensor is included in the sensing unit 140 and may be composed of one of an acceleration sensor, a gravity sensor and a geomagnetic sensor or a combination of two or more of the sensors. The controller 180 can determine the orientation of the side of the mobile terminal 100 on which the camera 121 is located through the posture sensor. For example, the controller 180 can determine whether the camera 121 of the mobile terminal 100 faces the ground or forward/backward direction parallel with the ground. When the controller 180 determines that the camera 121 faces the ground, the controller 180 can inactivate the camera 121 to stop a photographing operation of the camera 121. When the controller 180 determines that the camera 121 faces the forward/backward direction parallel with the ground, the controller 180 can activate the camera 121 to start a photographing operation. Since the controller 180 can control activation/inactivation of the camera 121 based on the mobile terminal's posture sensed by the posture sensor, optimized photographing can be performed even if the user does not additionally operate the camera 121.

When the camera 121 is activated, an image may be acquired from the activated camera 121 in operation S20. That is, a photographing operation using the camera 121 can be performed. The image captured by the camera 121 may be displayed on the display 151. When the user activates the camera 121 facing the forward direction, for example, the image captured by the camera 121 can be displayed on the display 151 in real time. Accordingly, when the user changes the orientation of the mobile terminal 100, an image captured by the camera 121 is changed and thus an image displayed on the display 151 my be different from the image captured by the camera 121.

Position information about a specific point included in the image may be acquired in operation S30. The controller 180 of the mobile terminal 100 may acquire information including the current position of the mobile terminal 100, the photographing direction of the camera 121, the view angle of the camera, etc. The current position of the mobile terminal 100 may be obtained through the location information module 115 included in the mobile terminal 100 using global navigation satellite system (GNSS). The GNSS can be classified into GPS, Galileo, GLONASS, COMPASS, IRNSS, QZSS, etc. according to operator.

The information on the photographing direction of the camera 121 can be acquired through the sensing unit 140 of the mobile terminal 100. For example, the orientation of the camera 121 of the mobile terminal 100 can be sensed using a geomagnetic sensor, an acceleration sensor, a gyro sensor, etc. The view angle of the camera 121 can be determined in the stage of production of the mobile terminal 100.

If the controller 180 obtains the information on the current position of the mobile terminal 100, the photographing direction of the camera 121 and the view angle of the camera, the controller 180 can recognize objects included in the currently captured image. For example, the controller 180 can obtain information about the fact that the Triumphal Arc is located 500 meters ahead and buildings on the left and right of the Triumphal Arc are displayed on the display 151 considering the view angle of the camera.

Upon the acquisition of position information about the specific point included in the image, information about the specific point may be obtained from a social network service (SNS) server in operation S40.

An image captured by the camera 121 may include various objects and specific information may be linked to an object included in the captured image. For example, information acquired from the SNS server can be linked to an object included in the captured image.

A social network service is an online service that focuses on building of social networks or social relations among people and provides means for a specific user to exchange information with registered or unregistered other users. For example, a first user can easily read or look a text or picture uploaded by a second user registered as a follower of the first user by using the SNS. Social network services include Twitter, Facebook, Myspace, me2DAY, etc. Position information may be tagged on the text or picture uploaded by the second user. That is, information about a place where the second user uploads the text or picture or information about a place that the second user wants to let the first user know may be tagged on the text or picture.

The controller 180 can obtain information about whether a specific place included in an image captured by the user of the mobile terminal 100 is linked with information corresponding to the specific place from the SNS server S, as shown in FIG. 7. Other mobile terminals 1000 and 2000 may upload information and position information about the specific place to the SNS server S. When the user of the mobile terminal 100 photographs the specific place while the SNS server S has the uploaded information about the specific place, the mobile terminal 100 can download the information linked to the specific place from the SNS server S. For example, users of the mobile terminals 1000 and 2000 who visited the Triumphal Arc in Paris can upload writing about the Triumphal Arc with position information of the Triumphal Arc to the SNS server S and the user of the mobile terminal 100 can download the writing from the SNS server S when photographing the Triumphal Arc using the camera 121.

Upon the acquisition of the information about the specific place from the SNS server S, the acquired information may be superposed on the specific place in the captured image and displayed in operation S50.

The display 151 of the mobile terminal 100 may display an image captured by the camera 121, as shown in FIG. 8. The displayed image may display information obtained from the SNS server S. For example, first information T1 about a first point L1 and second information T2 about a second point L2 can be displayed on the display 151. Since the first information T1 and the second information T2 have position information tagged thereon, as described above, the first information T1 and the second information T2 can be displayed at the specific points L1 and L2. Accordingly, the user of the mobile terminal 100 can recognize necessary information more intuitively because the acquired information superposed on the specific place is displayed on the display 151.

The augmented reality (AR) technique can be used when the acquired information is superposed on the image captured by the camera 121. That is, the acquired information can be displayed such that the information is integrated with the image captured by the camera 121. Furthermore, if the photographing direction of the camera 121 is changed, the information can be displayed such that the information corresponds to a changed image.

The controller 180 may determine whether the area photographed by the camera 121 is changed in operation S60 and newly acquire position information about the changed area.

FIGS. 9 through 20 illustrate an operating process of the mobile terminal according to another embodiment of this document. The mobile terminal according to another embodiment of this document can selectively filter and display only necessary information.

Figure 9:
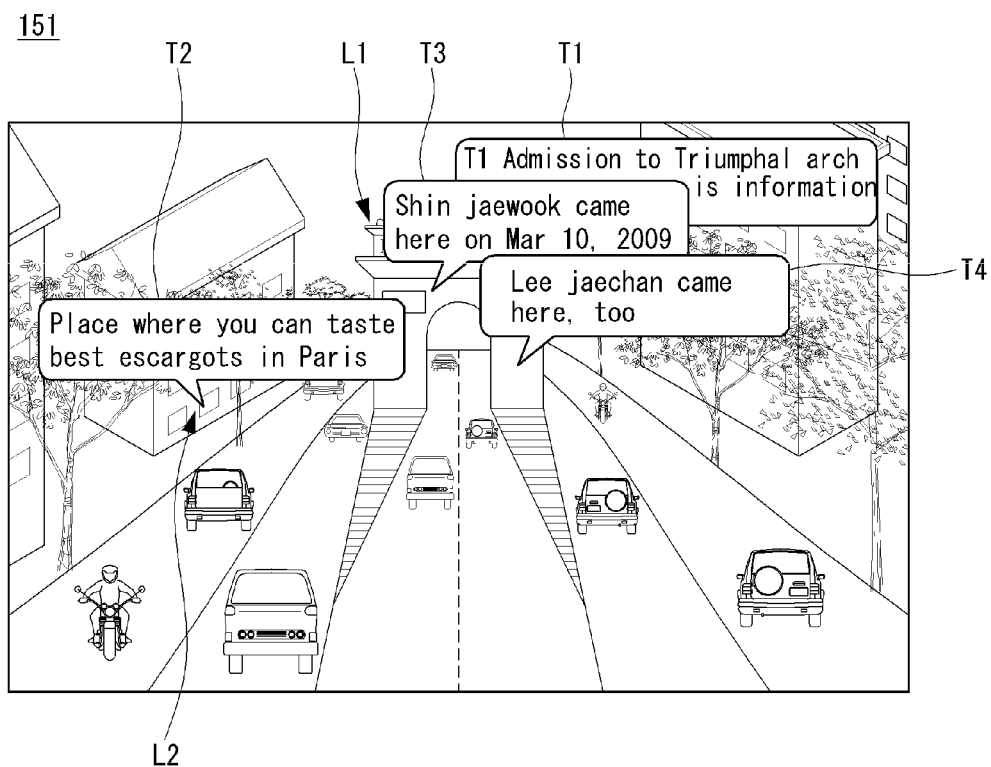
FIGS. 9 through 20 illustrate an operating process of the mobile terminal according to another embodiment of this document.

Referring to FIGS. 1 and 9, information may be displayed on a specific location included in the area captured by the camera 121. For example, the first information T1, third information T3 and fourth information are displayed on the first location L1 and the second information T2 is displayed on the second location L2. If multiple information items are displayed on the relatively small display 151, the whole or part of the displayed information may be overlapped. The overlapped information may include information that the user of the mobile terminal 100 requires. For example, the first information T1 may not be seen to the user due to the third information T3 and the fourth information T4 although the user is in interested in the first information T1.

Figure 10:
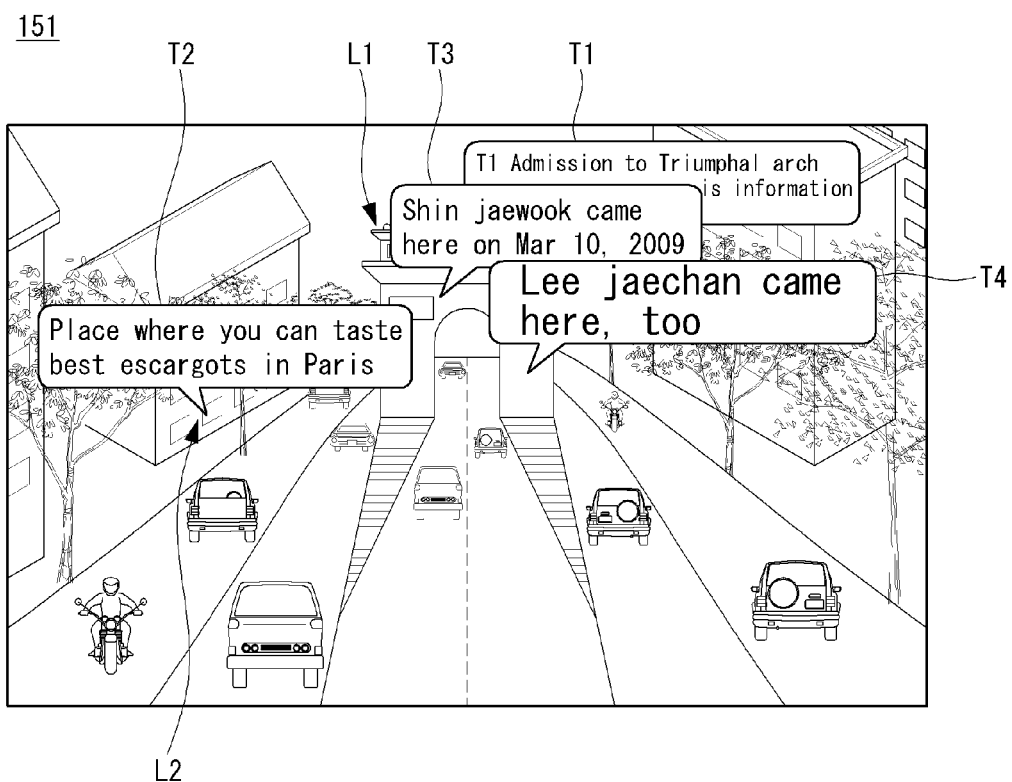

Referring to FIGS. 1 and 10, the controller 180 can arrange information and display the arranged information on the display 151. For example, the controller 180 can display text information items in different sizes. The controller 180 may display overlapped information items in different sizes. For example, the first, third and fourth information items T1, T3 and T4 are overlapped since they are tagged on the first location L1. If multiple information items are displayed in the same position in an overlapping manner, it may be difficult to recognize the information items. Accordingly, the controller 180 can display information items in different sizes to improve recognition of the information. The size of information may be determined based on information tagging time. For example, if the fourth information T4 is the latest information and the first information T1 the oldest information, the controller 180 can display the fourth information T4 relatively large and display the first information T1 relatively small such that the user can definitely recognize important information.

Figure 11:
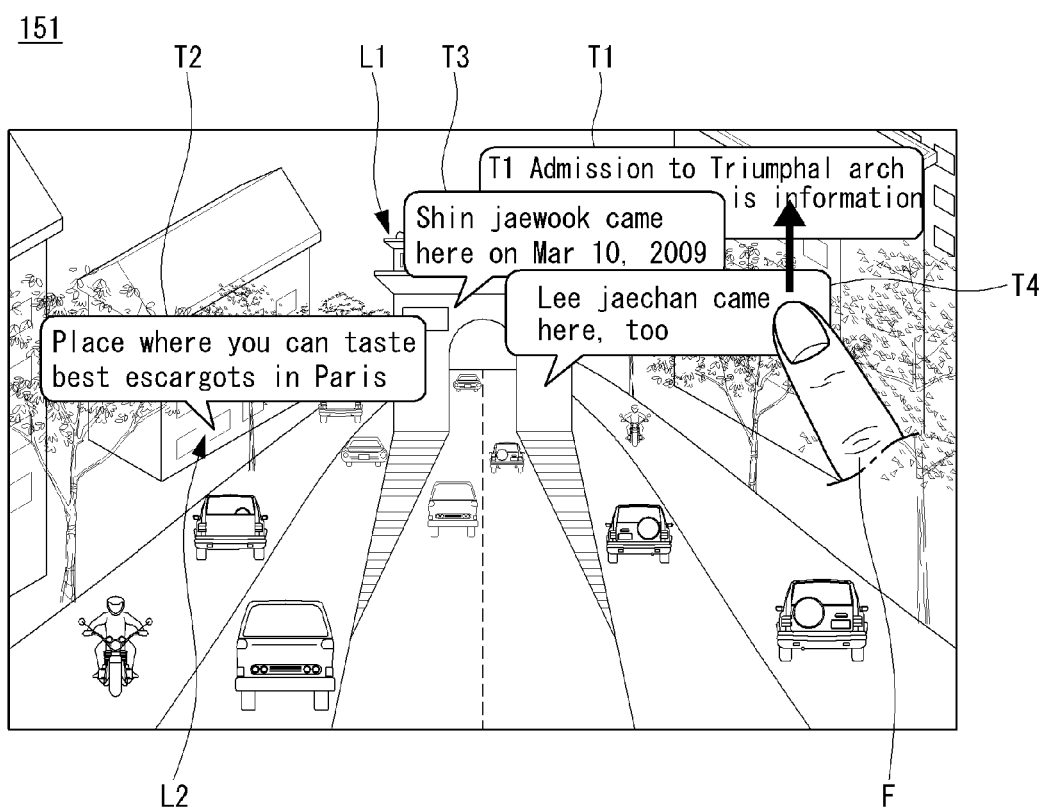
Figure 12:
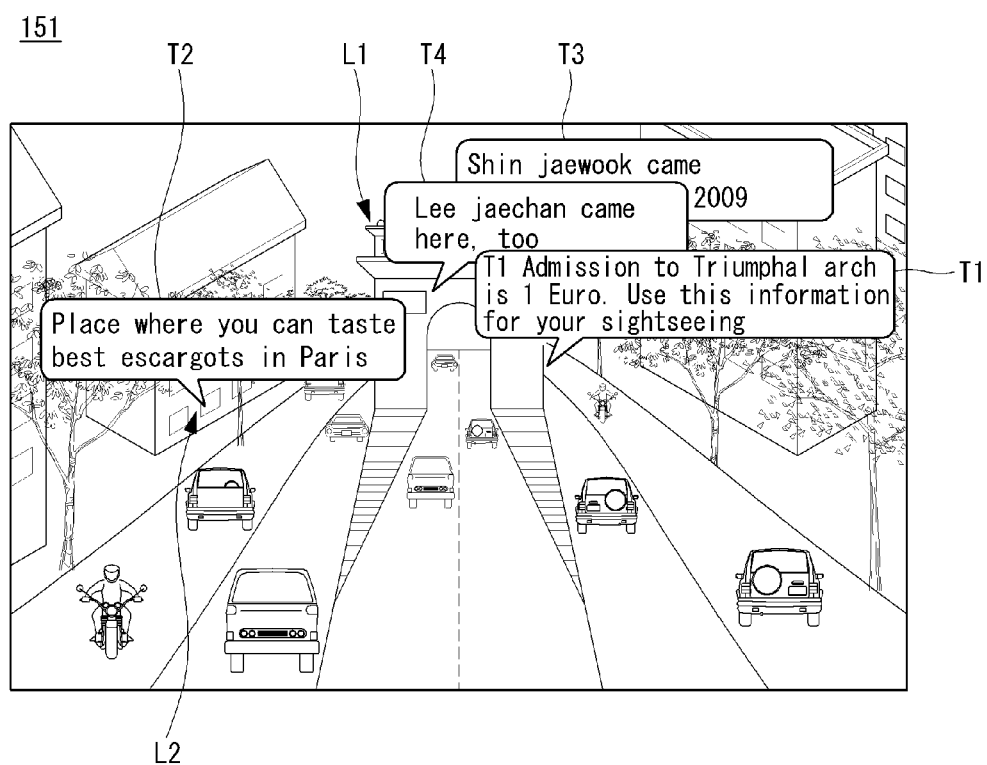

Referring to FIGS. 1, 11 and 12, the controller 180 may display information items in a rotating manner. For example, the first, third and fourth information items T1, T3 and T4 are tagged on the first location L1, and thus the first information T1 may be covered with the third and fourth information T3 and T4. In this case, the user may drag or flick the fourth information T4 upward with a finger F. Then, the positions of the first, third and fourth information items T1, T3 and T4 are changed. That is, the information tagged on the first location L1 is rotated and displayed in front. The user can drag or flick desired information to display the desired information on the display 151.

Figure 13:
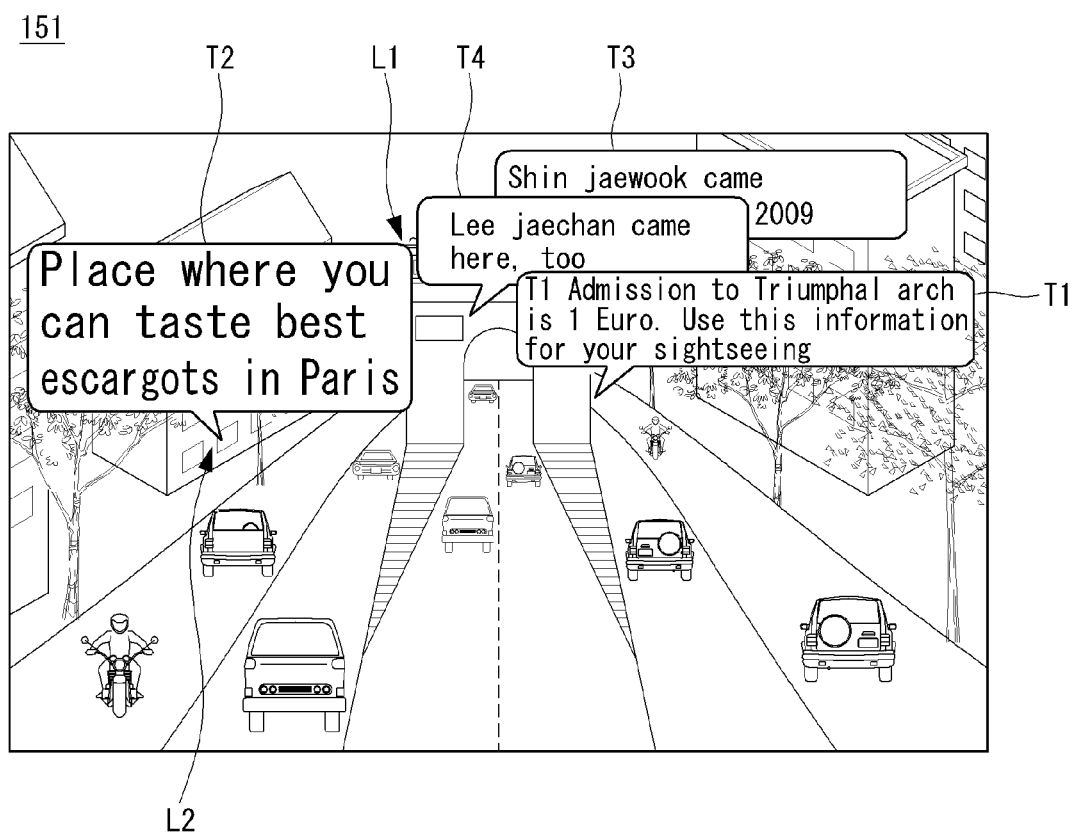

Referring to FIGS. 1 and 13, the controller 180 may display information close to the user in a relatively large size. For example, if the second location L2 is closer to the user, the controller 180 can display the second information T2 tagged on the second location L2 in a size larger than those of the first, third and fourth information T1, T3 and T4. That is, the controller 180 can display information about a location geographically close to the user in a relatively large size and display information about a location geographically distant from the user in a relatively small size, and thus the user can easily recognize the information displayed on the display 151.

Figure 14:
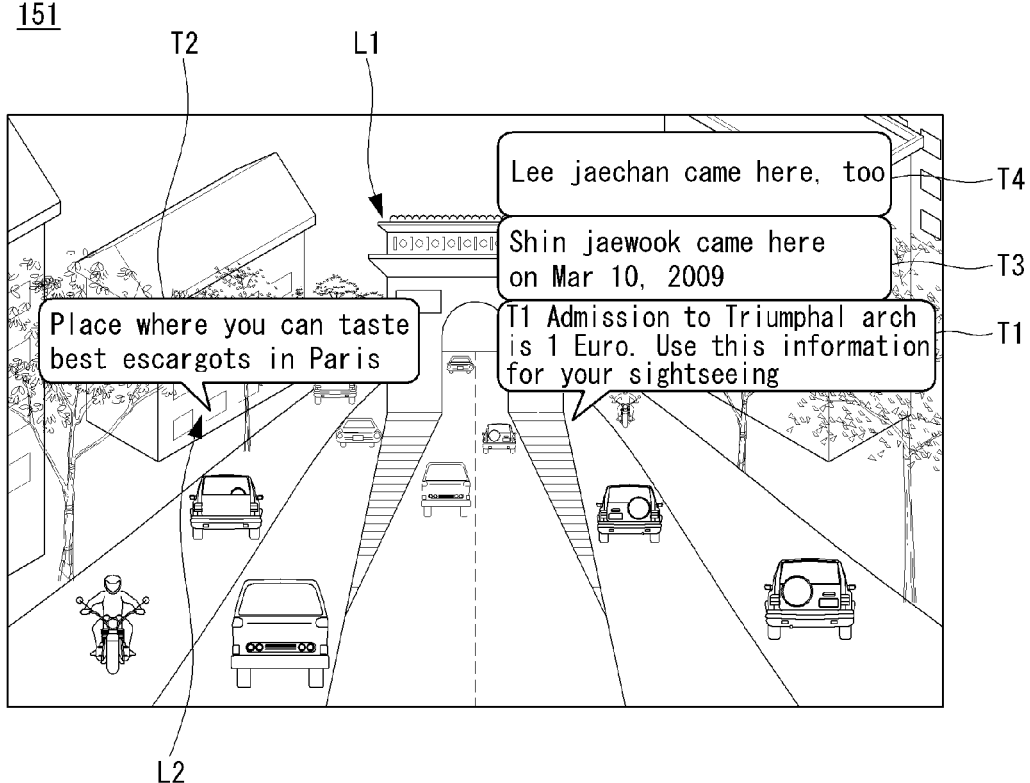

Referring to FIGS. 1 and 14, the controller 180 may display the information items such that they are not overlapped. For example, the controller 180 can display the first, third and fourth information items T1, T3 and T4 tagged on the first location L1 in parallel in the form of stairs. By doing so, the user can easily recognize the information.

Figure 15:
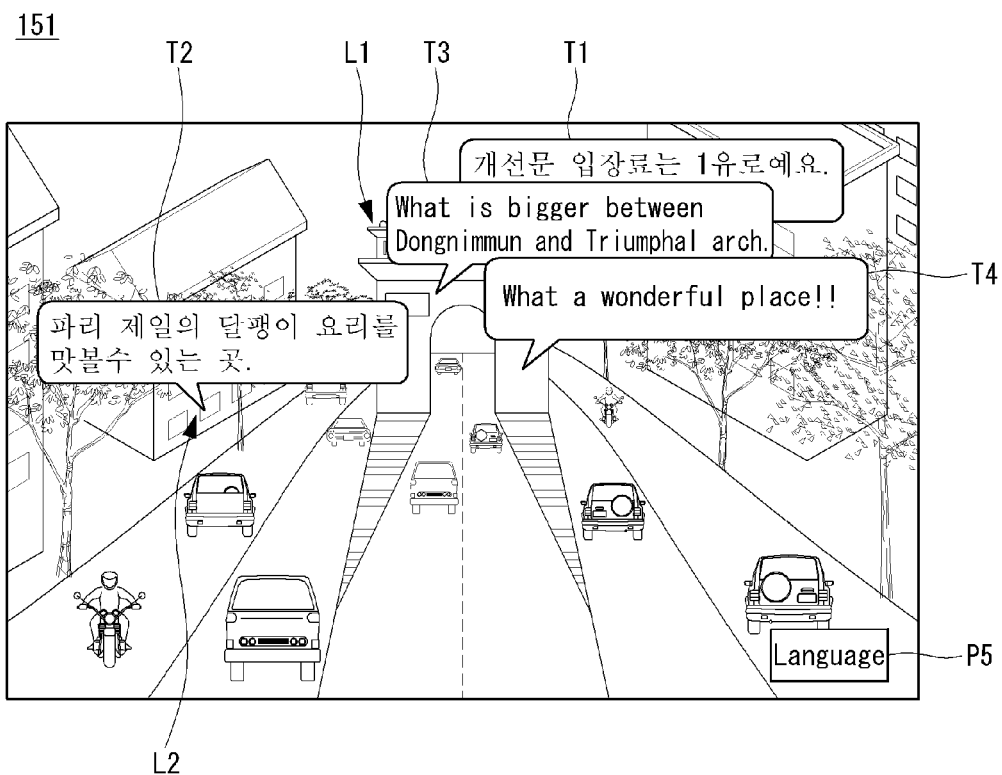
Figure 16:
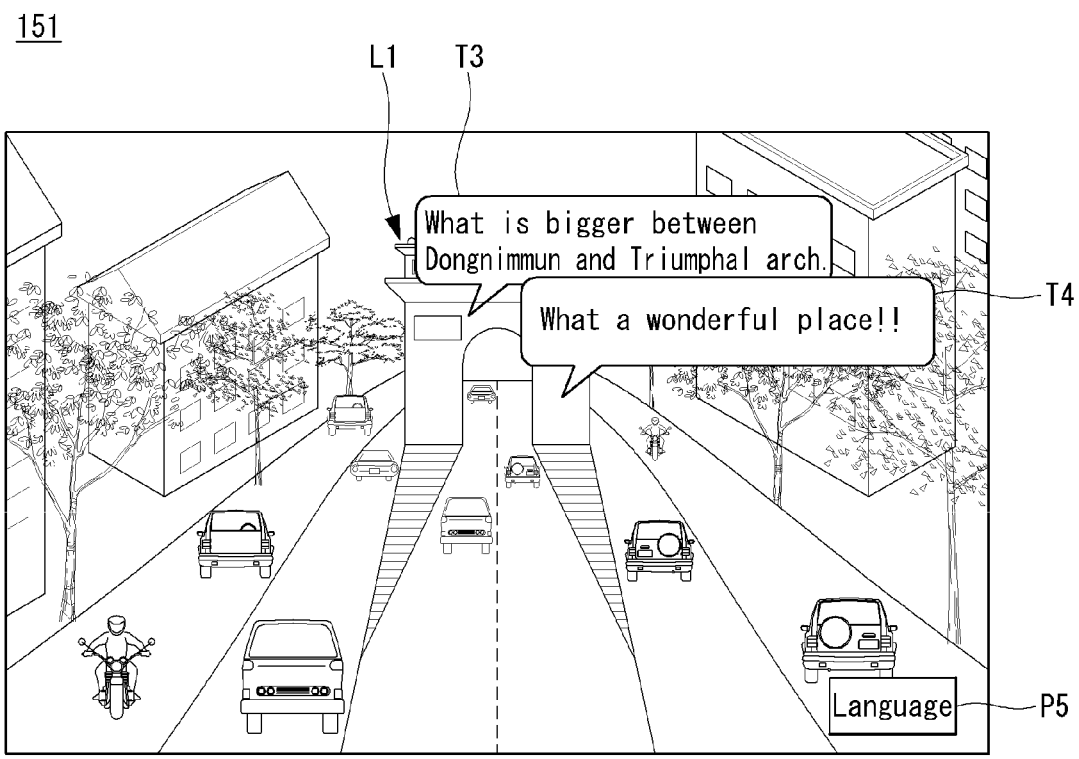

Referring to FIGS. 1, 15 and 16, the controller 180 may selectively display information in a specific language selected by the user. For example, the third and fourth information items T3 and T4 are displayed in English and the first information T1 is displayed in Korean, as shown in FIG. 15. In this case, the user can select a fifth button P5 for selecting a language. Then, only information in the specific language selected by the user can be displayed on the display 151, as shown in FIG. 16. Since only information that the user can understand is displayed, the user can effectively acquire information.

Figure 17:
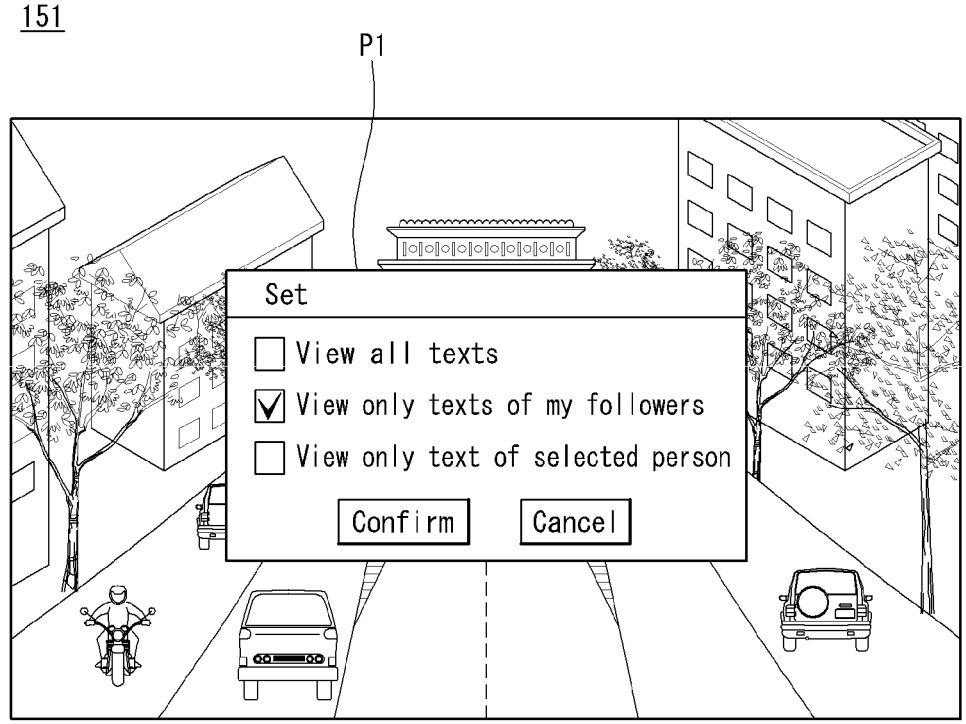

Referring to FIGS. 1 and 17, the mobile terminal 100 may provide a first pop-up window P1 for selecting information to be displayed on the display 151. For example, the mobile terminal 100 can provide options of viewing all texts, viewing only texts of followers and viewing only a text of a selected specific person through a first set window P1.

Figure 18:
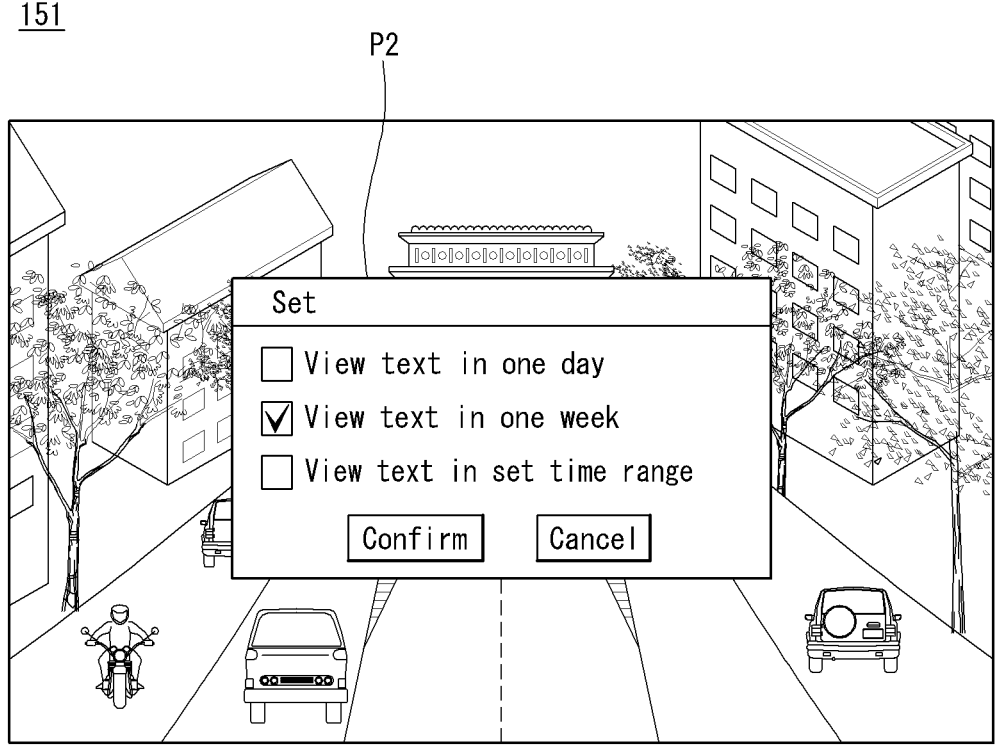

Referring to FIGS. 1 and 18, the user can select a time range of information to be displayed through a second pop-up window P2. When the user selects a specific time range, the controller 180 can display only information within the selected time range on the display 151.

Figure 19:
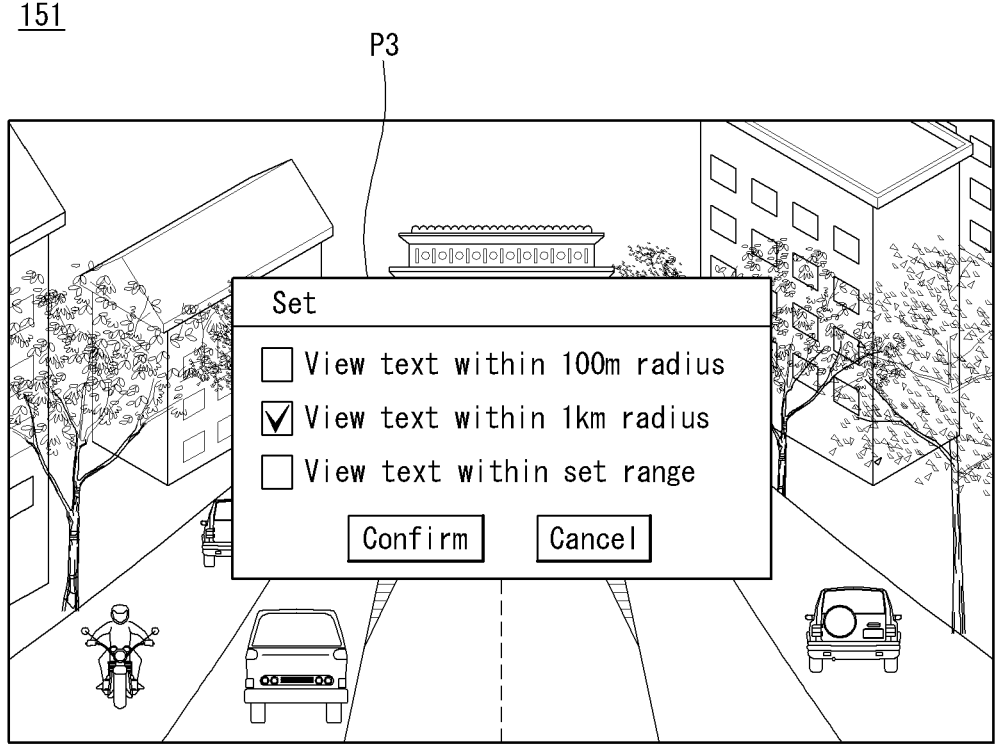

Referring to FIGS. 1 and 19, the user can select an area displaying necessary information through a third pop-up window P3. That is, the controller 180 can display only information within a specific range from the current position of the mobile terminal 100.

Figure 20:
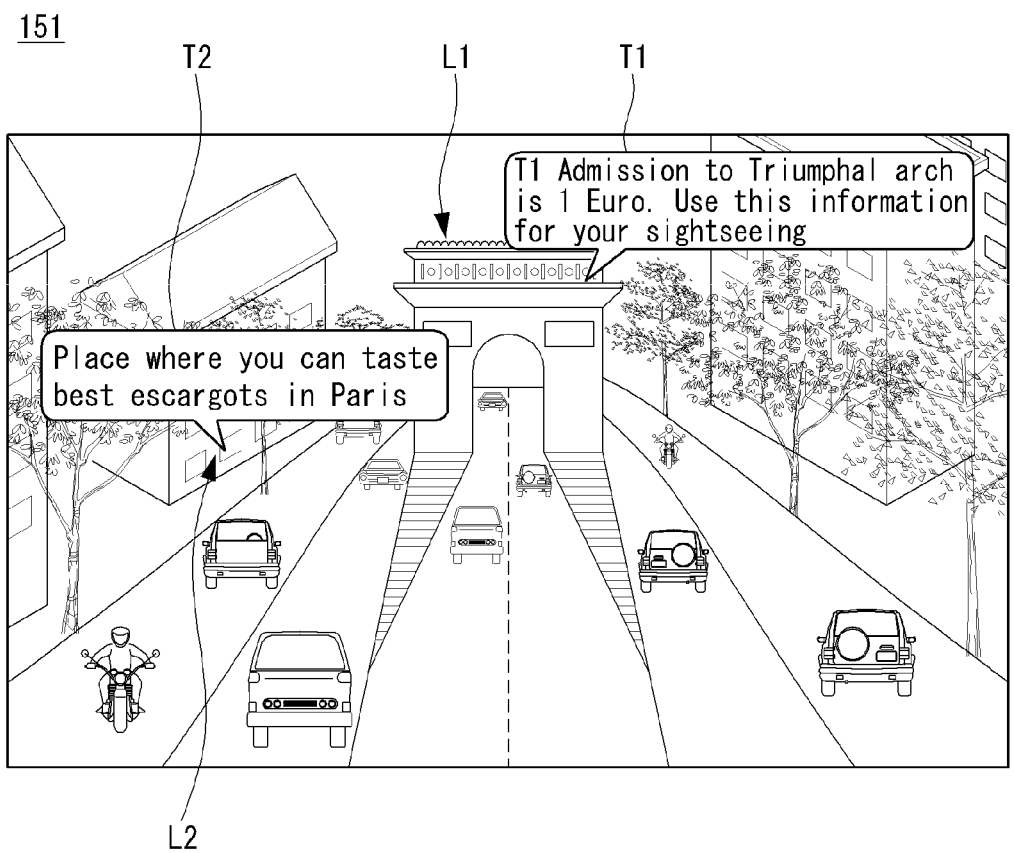

Referring to FIG. 20, the user can set at least one of conditions of a specific user, a specific time and a specific area to selectively display information that satisfies the set condition. Accordingly, the user can easily confirm desired information.

Information to be displayed may be filtered based on various standards. For example, a user who uploads a text can add his/her state information to the text. That is, the user can add state information such as date, going to movie, etc. When the text includes the state information, only specific state information can be selectively filtered.

Figure 21:
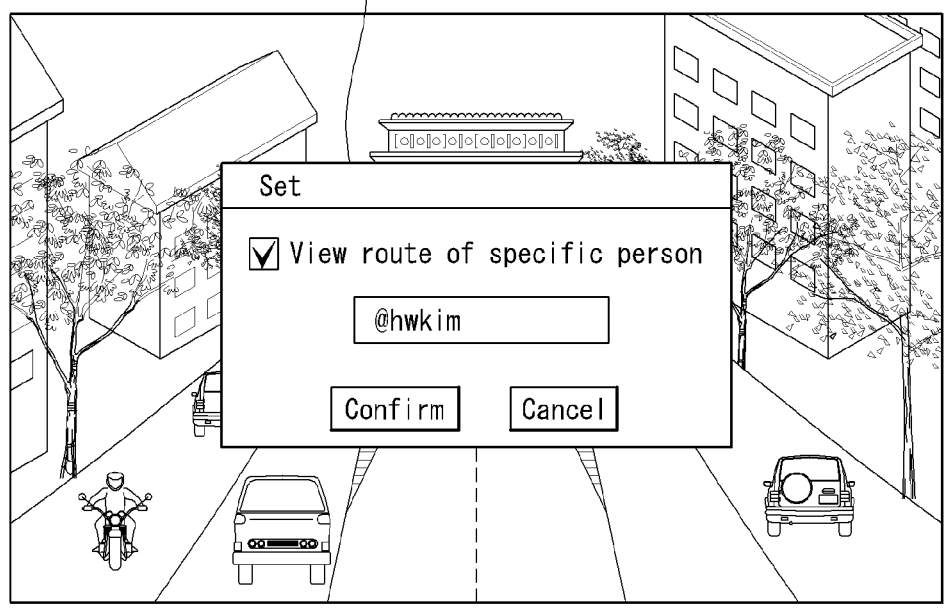
FIGS. 21 and 22 illustrate an operating process of the mobile terminal according to another embodiment of this document.
Figure 22:
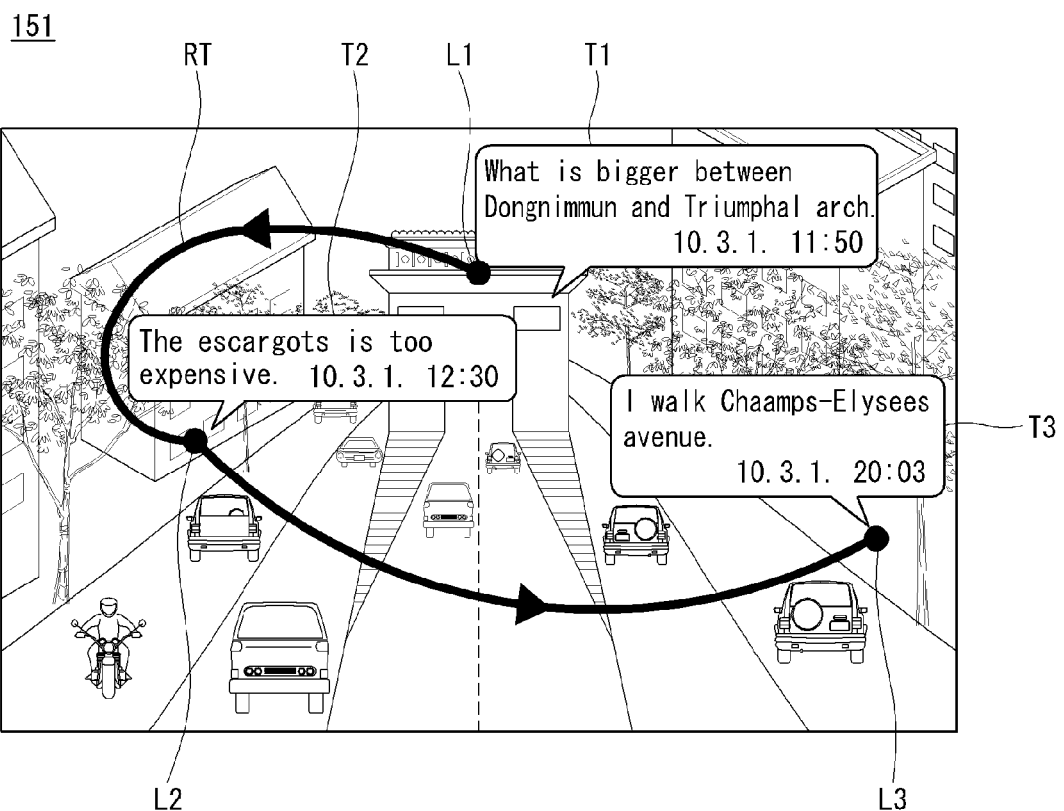

FIGS. 21 and 22 illustrate an operating process of the mobile terminal according to another embodiment of this document.

Referring to FIGS. 1, 21 and 22, the mobile terminal 100 can display a route of a specific person. The mobile terminal 100 can obtain information about the route of the specific person from data uploaded by the specific person to the SNS server (S shown in FIG. 7). For example, if the specific person uploaded texts at points A, B and C using social network service while moving from the point A through the point B to the point C, the uploaded texts may include position information and time information. Accordingly, the route of the specific person can be estimated using the position information and time information corresponding to the texts.

A fourth pop-up window P4 for selecting a specific person whose route will be traced may be displayed on the display 151, as shown in FIG. 21. The user of the mobile terminal 100 may input SNS ID of the specific person. Then, the display 151 may display the route of the specific person, as shown in FIG. 22. For example, the specific person uploaded texts to the SNS server (S shown in FIG. 7) from the first location L1 at 11:50, from the second location L2 at 12:30 and from the third location L3 at 20:03. The controller 180 can download the texts and determine the route of the specific person based on the time information included in the texts. Then, the controller 180 can display a trace RT that connects the locations L1, L2 and L3 on the display 151.

The controller 180 can display a predicted route of the specific person as well as his/her past route. If the specific person recorded his/her schedule on his/her terminal or SNS, the controller 180 can display an anticipated route based on the recorded schedule on the display 151.

Figure 23:
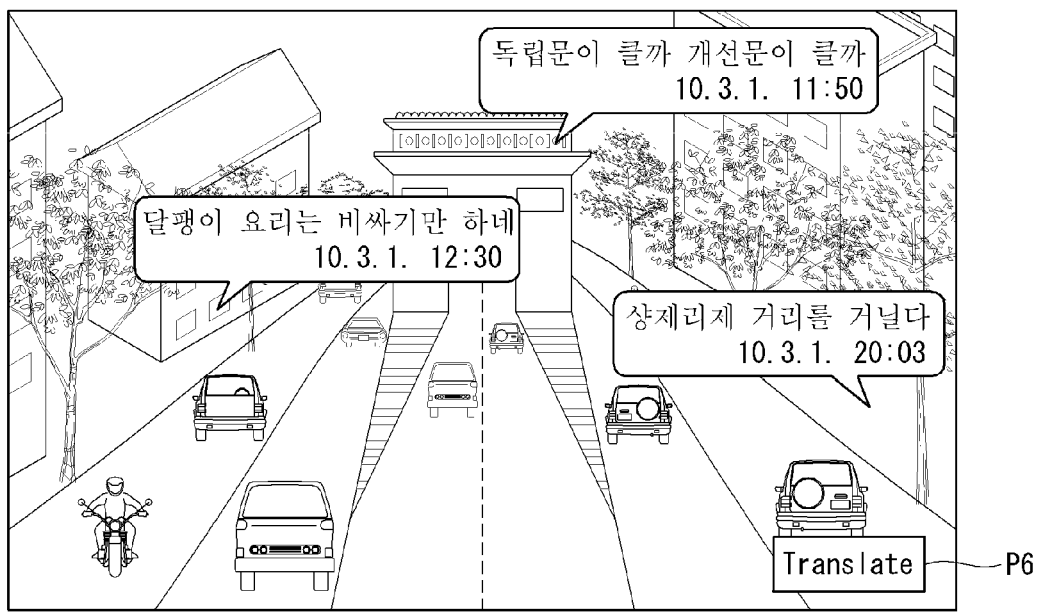
FIGS. 23 and 24 illustrate an operating process of the mobile terminal according to another embodiment of this document.
Figure 24:
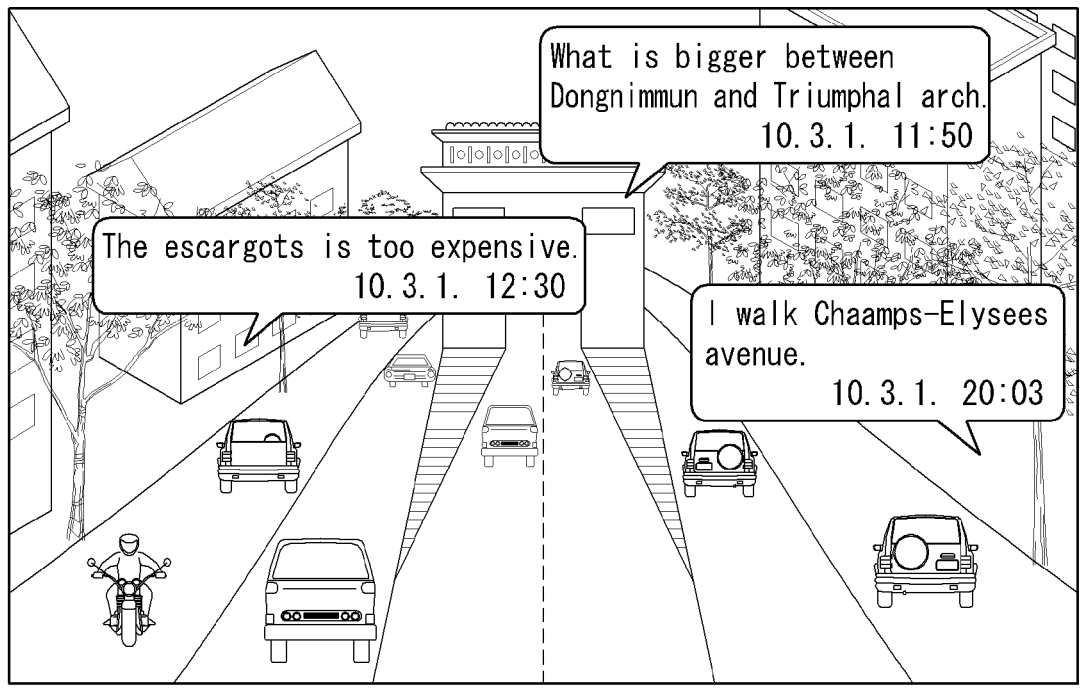

FIGS. 23 and 24 illustrate an operating process of the mobile terminal 100 according to another embodiment of this document. The mobile terminal can translate downloaded texts or request an external server to translate the downloaded texts.

Referring to FIGS. 1 and 23, the display 151 may display a sixth button P6 for executing a translating function. When the user selects the sixth button P6, the controller 180 can translate a downloaded text or request an external server to translate the downloaded text.

Referring to FIGS. 1 and 24, when the translation of the text is completed, the translated text can be displayed on the display 151.

Figure 25:
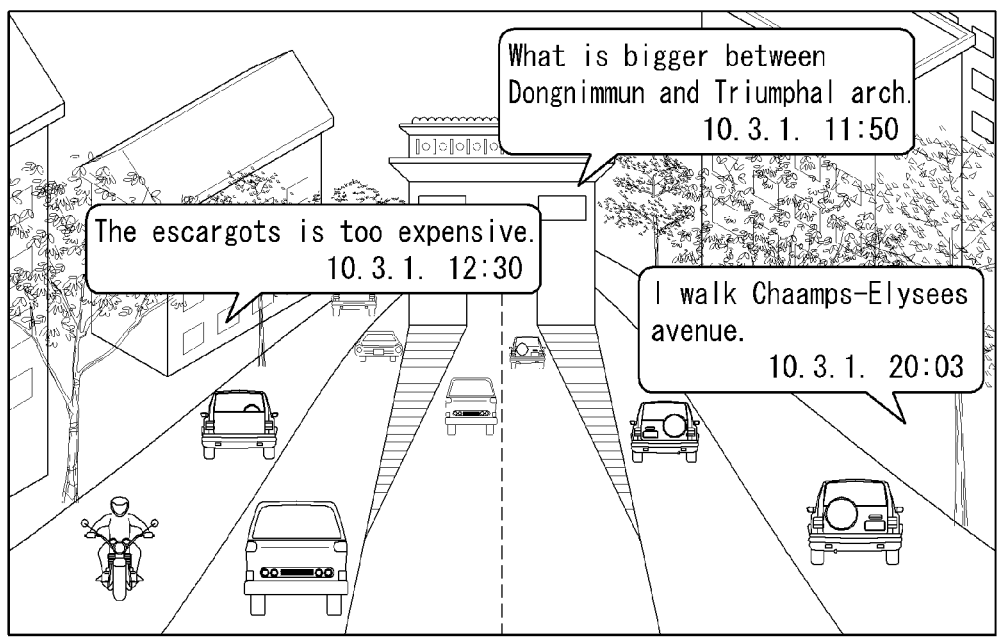
FIGS. 25 and 26 illustrate an operating process of the mobile terminal according to another embodiment of this document.
Figure 26:
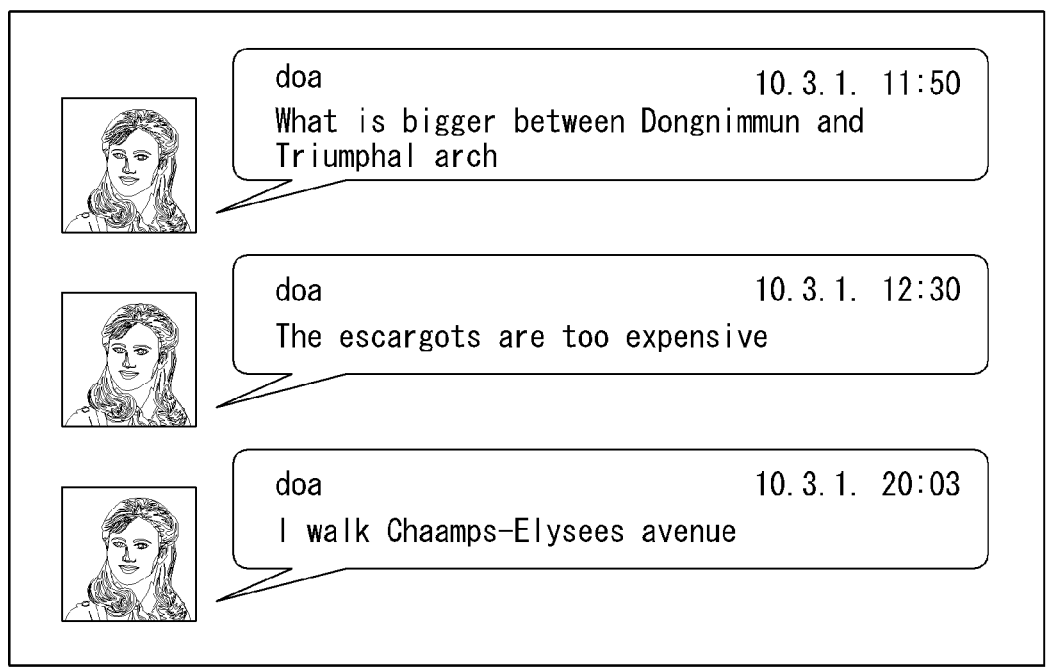

FIGS. 25 and 26 illustrate an operating process of the mobile terminal 100 according to another embodiment of this document. The mobile terminal 100 can apply AR technique to an image captured by the camera 121 and display texts corresponding to the image according to a user's choice or a control signal of the controller 180, or display the texts in the social network service's own manner.

Referring to FIGS. 1 and 25, the display 151 may display the image captured by the camera 121. The controller 180 can display the image captured by the camera 121 when the camera 121 takes a picture of an object in a direction that does not correspond to the ground.

Referring to FIGS. 1 and 26, the display 151 may display texts in the social network service's own way. If the camera 121 faces the ground, it may be considered that the user wants to use a function of the mobile terminal 100 other than the function of the camera 121. When the posture sensor included in the sensing unit 140 senses that the camera 121 faces the ground, the controller 180 can inactivate the camera 121 and display texts in the social network service's own manner.

Figure 27:
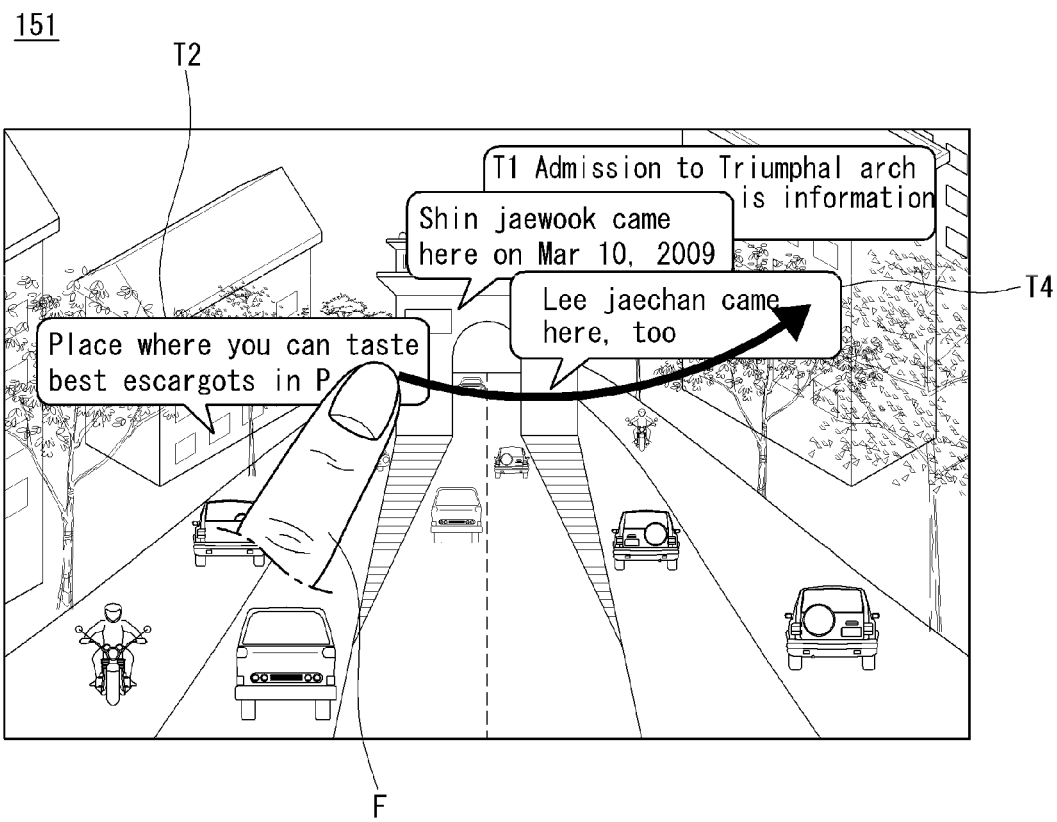
FIG. 27 illustrates an operating process of the mobile terminal according to another embodiment of this document.

FIG. 27 illustrates an operation of the mobile terminal 100 according to another embodiment of this document. The mobile terminal 100 can transmit a text uploaded by a first user to a second user.

Referring to FIGS. 1 and 27, the display 151 may display the second information T2 and the fourth information T4. Here, a second user who uploaded the second information T2 and a fourth user who uploaded the fourth information T4 may not know each other. That is, the user of the mobile terminal 100 may know the second and fourth users but the second and fourth users may not have a relationship between them. In this case, the fourth user cannot see the second information T2 uploaded by the second user and the second user cannot see the fourth information T4 uploaded by the fourth user although the user of the mobile terminal 100 can see both the second information T2 and the fourth information T4. In this state, the user of the mobile terminal 100 can make a dragging touch using a finger F having the second information T2 as a starting point and having the fourth information T4 as an end point. Upon this dragging touch operation, the second information T2 can be transmitted to the fourth user. To represent that the second information T2 has been delivered to the fourth user, the controller 180 can display the second information T2 right under the fourth information T4.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of this document. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a camera configured to capture images;
a wireless communication unit configured to transmit and receive information;
a display configured to display an image obtained by the camera; and
a controller configured to:
control the display to display the obtained image;
acquire, via the wireless communication unit, information items corresponding to one or more specific locations included in the obtained image;
superimpose the acquired information items over the one or more specific locations in the image; and
rearrange at least one information item among the information items displayed on the display based on at least one standard that is set in response to a user's touch input received on the display,
wherein the information items and position information tagged on the one or more specific locations are acquired from a social network service (SNS) server.

2. The mobile terminal of claim 1, wherein the controller is further configured to selectively filter the information items based on the at least one standard.

3. The mobile terminal of claim 2, wherein the controller is further configured to control the display to display texts corresponding to the filtered information items in different sizes based on time when each of the filtered information items has been generated.

4. The mobile terminal of claim 2, wherein the controller is further configured to control the display to display texts corresponding to the filtered information items in different sizes based on locations on which the filtered information items are tagged and a distance between each of the one or more specific locations and a current position of the mobile terminal.

5. The mobile terminal of claim 2, wherein the controller is further configured to control the display to display one of the filtered information items in front of the rest of the filtered information items in response to a touch input applied to a touch screen of the display.

6. The mobile terminal of claim 2, wherein the controller is further configured to control the display to display the filtered information items in a specific language set by the user.

7. The mobile terminal of claim 2, wherein the at least one standard comprises at least a person who uploaded the information items, time when the information items were uploaded, or locations where the information items were uploaded.

8. The mobile terminal of claim 1, wherein the controller is further configured to control the display to display a moving trace of at least one specific person selected by the user.

9. The mobile terminal of claim 8, wherein the information items corresponding to the one or more specific locations comprise time information about time when each of the information items has been generated and the controller is further configured to control the display to display the moving trace based on the position information and the time information.

10. The mobile terminal of claim 9, wherein the controller is further configured to control the display to display an anticipated route of the selected specific person.

11. The mobile terminal of claim 1, wherein the controller is further configured to:
translate the information items displayed in a first language into a second language and control the display to display the information items in the second language; or
obtain the information items translated into the second language from an external device and control the display to display the translated information items in the second language.

12. The mobile terminal of claim 1, wherein the controller is further configured to activate or deactivate the camera based a photographing direction of the camera.

13. The mobile terminal of claim 12, wherein the controller is further configured to deactivate the camera when the camera faces ground.

14. A method of controlling a mobile terminal, the method comprising:
obtaining an image via a camera of the mobile terminal;
displaying the obtained image on a display of the mobile terminal;
acquiring information items corresponding to one or more specific locations included in the obtained image and position information tagged on the one or more specific locations from a social network server;
superimposing the acquired information items over the one or more specific locations in the obtained image based on the position information such that the obtained image is displayed with the superimposed information items; and
rearranging at least one information items among the information items displayed on the display based on at least one standard that is set in response to a user's touch input received on the display.

15. The method of claim 14, further comprising selectively filtering the information items based on the at least one standard.

16. The method of claim 15, wherein the at least one standard comprises at least a person who uploaded the information items, time when the information items were uploaded, or locations where the information items were uploaded.

17. The method of claim 14, further comprising displaying a moving trace of at least one specific person selected by the user.

18. The method of claim 17, further comprising displaying an anticipated route of the selected specific person.

19. The method of claim 14, further comprising activating or inactivating the camera based on a photographing direction of the camera.

* * * * *